United States Patent
Guo et al.

(10) Patent No.: US 11,438,685 B2
(45) Date of Patent: Sep. 6, 2022

(54) WEARABLE DEVICE, WEARING DETECTION METHOD, AND STORAGE MEDIUM

(71) Applicant: SHENZHEN GOODIX TECHNOLOGY CO., LTD., Shenzhen (CN)

(72) Inventors: Zicheng Guo, Shenzhen (CN); Shuqing Cheng, Shenzhen (CN); Ming Yang, Shenzhen (CN); Fulin Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 249 days.

(21) Appl. No.: 16/890,816

(22) Filed: Jun. 2, 2020

(65) Prior Publication Data
US 2020/0314527 A1    Oct. 1, 2020

Related U.S. Application Data

(63) Continuation of application No. PCT/CN2019/079578, filed on Mar. 25, 2019.

(51) Int. Cl.
*H04R 1/10* (2006.01)
*G06F 3/01* (2006.01)
(Continued)

(52) U.S. Cl.
CPC ........... *H04R 1/1041* (2013.01); *G06F 3/011* (2013.01); *H04R 1/1016* (2013.01); *H04R 11/00* (2013.01); *H04R 15/00* (2013.01)

(58) Field of Classification Search
CPC .... H04R 1/1041; H04R 1/1016; H04R 11/00; H04R 15/00; H04R 19/00; H04R 29/001;
(Continued)

(56) References Cited

U.S. PATENT DOCUMENTS 10,152,162 B1    12/2018  Bokma
10,999,667 B2 *   5/2021  Yang .................. H04R 1/10
(Continued)

FOREIGN PATENT DOCUMENTS

CN    102149032 A  *  8/2011
CN    102802099 A  * 11/2012  .......... H03K 17/962
(Continued)

OTHER PUBLICATIONS

The Notice of Allowance of the parallel CN application.
(Continued)

*Primary Examiner* — Angelica M McKinney
(74) *Attorney, Agent, or Firm* — J.C. Patents

(57) ABSTRACT

Embodiments of the present application provide a wearable device, a wearing detection method and a storage medium. The wearable device includes: a device housing; a capacitive sensor, a processing module and a metal structural component which are provided inside the device housing, where the metal structural component is adhered to the capacitive sensor. The metal structural component is configured to increase an electrostatic induction region of the capacitive sensor; the processing module is configured to: obtain a real-time capacitance value and an inherent capacitance value of the capacitive sensor to ground, determine a real-time difference between the real-time capacitance value and the inherent capacitance value, and determine the wearable device to be in a worn state when the real-time difference is greater than a preset threshold.

17 Claims, 5 Drawing Sheets

(51) Int. Cl.
*H04R 11/00* (2006.01)
*H04R 15/00* (2006.01)

(58) Field of Classification Search
CPC . H04R 1/10; G06F 3/011; G06F 1/163; G06F 3/044; G01V 3/00
See application file for complete search history.

(56) References Cited

U.S. PATENT DOCUMENTS

| | | | |
|---|---|---|---|
| 2006/0233413 A1* | 10/2006 | Nam | H04R 1/1041 381/380 |
| 2015/0002455 A1 | 1/2015 | Zhang | |
| 2018/0150126 A1 | 5/2018 | Xu | |

FOREIGN PATENT DOCUMENTS

| | | | | |
|---|---|---|---|---|
| CN | 102802099 | A | 11/2012 | |
| CN | 105554616 | A | 5/2016 | |
| CN | 105769196 | A | 7/2016 | |
| CN | 106153098 | A | 11/2016 | |
| CN | 106249302 | A | 12/2016 | |
| CN | 106524408 | A | 3/2017 | |
| CN | 106645978 | A | 5/2017 | |
| CN | 106792314 | A | 5/2017 | |
| CN | 106982403 | A | 7/2017 | |
| CN | 107065016 | A | 8/2017 | |
| CN | 107065016 | A * | 8/2017 | G01V 3/00 |
| CN | 107106044 | A | 8/2017 | |
| CN | 107817537 | A | 3/2018 | |
| CN | 107894840 | A | 4/2018 | |
| CN | 107907916 | A | 4/2018 | |
| CN | 108337903 | A | 7/2018 | |
| CN | 108564179 | A | 9/2018 | |
| CN | 108955758 | A | 12/2018 | |
| CN | 108955759 | A | 12/2018 | |
| CN | 109101098 | A | 12/2018 | |
| CN | 109168102 | A | 1/2019 | |
| CN | 208607693 | U | 3/2019 | |

OTHER PUBLICATIONS

The Scenairo Based Digital Jewelry.
First Office Action of corresponding Chinese application.
Second Office Action of corresponding Chinese application.
Search report for PCT/CN2019/079578.
Theoretical Analysis of the Influence of Inserting Dielectric Plate and Conductor Plate on Capacitance of Capacitor.
The publication of granted application of CN 2019800005576.
"The Scenairo Based Digital Jewelry", by Liang An, Thesis, Hunan University, May 2017.

* cited by examiner

WEARABLE DEVICE, WEARING DETECTION METHOD, AND STORAGE MEDIUM

CROSS-REFERENCE TO RELATED APPLICATIONS

This application is a continuation of International Application No. PCT/CN2019/079578, filed on Mar. 25, 2019, the disclosure of which is hereby incorporated by reference in its entirety.

TECHNICAL FIELD

The present application relates to the field of wearable technologies and, in particular, to a wearable device, a wearing detection method and a storage medium.

BACKGROUND

With the development of technologies, electronic devices are becoming more and more intelligent. For example, most wireless earphones have a wearing detection function. When it is not detected that the earphone is worn, the earphone automatically enters the sleeping state; and when it is detected that the earphone is worn, the earphone quickly wakes up from "sleeping" and enters the working state to respond to user operations quickly, which achieves the purpose of reducing power consumption and extending battery life, and improves the user experience.

The wearing detection methods in the prior art generally adopt an optical solution and a capacitance detection solution. For the optical solution, it is usually needed to make holes in the earphone housing to ensure that the sensor receives sufficient signals, which has high process requirement, complex structure and sensing circuit system, poor waterproof performance, and high mass-production cost. For the capacitance detection solution, in order to deploy the sensor in the sensitive region where the earphone contacts the human ear, it is usually needed to dig a groove in the earphone housing to locate the sensor, which increases the structural complexity of the earphone and limits the scope of application.

In summary, the above wearing detection solutions all have the problems of structural complexity, difficulty in mass production, and high cost.

SUMMARY

The present application provides a wearable device, a wearing detection method and a storage medium, which are used to solve the problems of structural complexity, difficulty in mass production and high cost of the existing earphone wearing detection solutions.

A first aspect of the present application provides a wearable device, including: a device housing; a capacitive sensor, a processing module and a metal structural component which are provided inside the device housing, where the metal structural component is adhered to the capacitive sensor;

the metal structural component is configured to increase an electrostatic induction region of the capacitive sensor; the processing module is configured to: obtain a real-time capacitance value and an inherent capacitance value of the capacitive sensor to ground, determine a real-time difference between the real-time capacitance value and the inherent capacitance value, and determine the wearable device to be in a worn state when the real-time difference is greater than a preset threshold.

In this embodiment, by adhering the capacitive sensor provided inside the device housing to the metal structural component, the wearing detection performance is improved without changing the structure of the wearable device, and the problems of structural complexity, difficulty in mass production and high cost of the existing detection solutions are solved.

In a possible design of the first aspect, the real-time difference is determined according to a first capacitance value and a second capacitance value;

the first capacitance value is a difference between a real-time capacitance value of the metal structural component to the ground and an inherent capacitance value of the metal structural component to the ground;

the second capacitance value is a capacitance value between the metal structural component and the capacitive sensor.

In another possible design of the first aspect, the capacitive sensor is a differential capacitive sensor.

In this embodiment, by adhering the differential capacitive sensor to the metal structural component, the influence of temperature drift can be eliminated and the wearing detection performance can be improved.

In still another possible design of the first aspect, the wearable device further includes: a metal bracket provided inside the device housing;

the metal structural component is the metal bracket.

In this embodiment, by adhering the metal bracket to the capacitive sensor, the human-body sensitive region of the wearable device can be increased, so that the capacitance detection effect when the human body approaches or wears the wearable device can be improved.

In yet another possible design of the first aspect, the wearable device includes: an earphone.

In the foregoing possible designs of the first aspect, the wearable device further includes: a sound generating unit provided inside the device housing;

the metal structural component is a metal housing and/or a magnet of the sound generating unit.

In this embodiment, the metal housing and/or the magnet of the sound generating unit are original components in the earphone, so that it is not necessary to change the structure of the wearable device, thereby reducing the structural complexity of the wearable device.

In the foregoing possible designs of the first aspect, a type of the sound generating unit is a moving-coil type, and that the metal structural component is adhered to the capacitive sensor includes that:

the capacitive sensor is adhered to one side of the metal housing and/or one side of the magnet.

In the foregoing possible designs of the first aspect, the capacitive sensor includes: a sensor upper electrode plate, a sensor intermediate medium, and a sensor lower electrode plate;

that the capacitive sensor is adhered to one side of the metal housing and/or one side of the magnet includes that:

the sensor upper electrode plate is adhered to a first side of the metal housing and/or a first side of the magnet, and the first side is a side away from a wearing side of the wearable device.

In this embodiment, by adhering the sensor upper electrode plate to the first side of the metal housing and/or the first side of the magnet, the electrostatic induction area is increased and the signal amount is increased without changing the structure of the wearable device. In addition, the anti-sweat effect of the earphone is improved and the rate of falling off mistakenly is reduced.

In a further possible design of the first aspect, a part of the metal housing is wrapped inside the capacitive sensor.

In the foregoing possible designs of the first aspect, the capacitive sensor includes: a sensor upper electrode plate, a sensor intermediate medium, and a sensor lower electrode plate;

that the metal structural component is adhered to the capacitive sensor includes that:

the part of the metal housing is adhered to the sensor lower electrode plate.

The technical solution can also increase the electrostatic induction area when the human body approaches or wears the wearable device, and the solution has the advantages of simple installation and low mass-production cost.

In any of the foregoing possible designs of the first aspect, the metal structural component is sheet-shaped, and an area of a surface of the metal structural component that is adhered to the capacitive sensor is larger than an area of a surface of the capacitive sensor that is adhered to the metal structural component.

In this embodiment, the metal structure may be sheet-shaped, and the area of the surface of the metal structural component that is adhered to the capacitive sensor is larger than the area of the surface of the capacitive sensor that is adhered to the metal structural component, which enlarges the human-body sensitive region of the wearable device and improves the wearing detection performance.

A second aspect of the present application provides a wearing detection method, applied to a wearable device, where the wearable device includes: a device housing; a capacitive sensor, a processing module and a metal structural component which are provided inside the device housing, where the metal structural component is adhered to the capacitive sensor, and the metal structural component is configured to increase an electrostatic induction region of the capacitive sensor; the method includes:

obtaining a real-time capacitance value and an inherent capacitance value of the capacitive sensor to ground;

determining a real-time difference between the real-time capacitance value and the inherent capacitance value; and determining the wearable device to be in a worn state when the real-time difference is greater than a preset threshold.

In a possible design of the second aspect, the determining a real-time difference between the real-time capacitance value and the inherent capacitance value, includes:

obtaining a first capacitance value, where the first capacitance value is a difference between a real-time capacitance value of the metal structural component to the ground and an inherent capacitance value of the metal structural component to the ground;

obtaining a second capacitance value, where the second capacitance value is a capacitance value between the metal structural component and the capacitive sensor; and determining the real-time difference based on the first capacitance value and the second capacitance value.

For the beneficial effects of the possible designs of the second aspect, please refer to the foregoing description of the first aspect, which will not be repeated here.

A third aspect of the present application provides a storage medium, where the storage medium has instructions stored thereon which, when running on a computer, cause the computer to execute the methods described in the foregoing second aspect and the possible designs of the second aspect.

For the wearable device, the wearing detection method and the storage medium provided in the embodiments of the present application, the wearable device includes: a device housing; a capacitive sensor, a processing module and a metal structural component provided inside the device housing, where the metal structural component is adhered to the capacitive sensor. The metal structural component could increase an electrostatic induction region of the capacitive sensor; the processing module obtains a real-time capacitance value and an inherent capacitance value of the capacitive sensor to the ground, determines a real-time difference between the real-time capacitance value and the inherent capacitance value, and determines the wearable device to be in a worn state when the real-time difference exceeds a preset threshold. This technical solution improves the wearing detection performance and solves the problems of structural complexity, difficulty in mass production and high cost of the existing detection solutions, without changing the structure of the wearable device.

DESCRIPTION OF EMBODIMENTS

Figure 1:
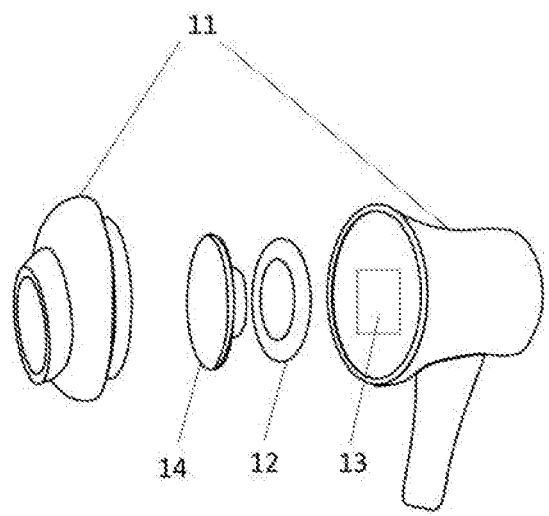
FIG. 1 is an exploded diagram of a first embodiment of a wearable device provided by embodiments of the present application.

In order to make the objectives, technical solutions, and advantages of embodiments of the present application clearer, the technical solutions in the embodiments of the present application will be clearly and comprehensively described with reference to the accompanying drawings in the embodiments of the present application. Obviously, the described embodiments are the part but not all of the embodiments of the present application. Based on the embodiments of the present application, all other embodiments obtained by those skilled in the art without creative efforts shall fall within the protection scope of the present application.

Unless otherwise defined, all technical and scientific terms used herein have the same meaning as commonly understood by those skilled in the art to which the present application belongs. The terms used in the description of the present application are only for the purpose of describing specific embodiments, but not intended to limit the present application. The term "and/or" as used herein includes any and all combinations of one or more of the associated listed items. The terms "first", "second" and the like are used to distinguish similar objects, and do not have to be used to describe a particular order or sequence. It should be understood that the terms so used are interchangeable under appropriate circumstances in order to describe the embodiments of the present application. Furthermore, the terms "include" and "have" and any of their variations are intended to cover non-exclusive inclusions, for example, processes, methods, systems, products, or devices that include a series of steps or units need not to be limited to those explicitly listed steps or units, but may include other steps or units that are not explicitly listed or inherent to these processes, methods, products or devices.

For the wearable device, the wearing detection method and the storage medium provided in the embodiments of the present application, the wearable device may be, for example, a smart bracelet, a smart watch, a smart earphone, smart glasses, etc. In order to improve the battery life of a wearable device, the wearable device needs to have a wearing state detection function, so that some functions of the wearable device can be controlled or optimized according to the detection result of the wearing state. For example, according to the wearing state of the bracelet, it is possible to avoid the misjudgment of stillness as sleeping.

Exemplarily, the application scenarios of the embodiments of the present application will be explained with reference to a smart earphone as the wearable device.

Smart earphones, especially Bluetooth earphones, are more and more widely used due to their advantages such as compactness, portability, easy operations, and wide usage scenarios.

Generally, the smart earphones use Bluetooth and wireless modules to reduce the entanglement in wires, and users can make phone calls and listen to music in a more comfortable way. However, due to the characteristics of the earphone structure, the internal space is limited. In order to make full use of the internal space, the size and installation position of various internal modules must be strictly controlled, which results in the shortcomings of Bluetooth earphones such as poor scalability, difficulty in installation, and short battery life. Therefore, most smart earphones have a wearing detection function.

When it is not detected that the earphone is worn (earphone in ear), the earphone enters the sleeping mode to reduce the power consumption, and when it is detected that the earphone is worn, the earphone enters the working state to improve the user experience. For example, in a music listening scene, a terminal device connected to the earphone can automatically play music when the earphone detects that it is worn by a user, and the terminal device can automatically stop playing the music when the earphone detects that it is removed, thereby simplifying the user's operation steps.

According to the description in the Background, the current wearing detection solution mainly includes an optical detection solution and a capacitance detection solution. However, the foregoing detection solutions all have the problems of structural complexity, difficulty in mass production and high cost.

Using the wearable device, the wearing detection method and the storage medium provided by the embodiments of the present application, by adhering a metal structural component to a capacitive sensor within the wearable device, the electrostatic induction region of the capacitive sensor is increased and the wearing detection performance is improved without changing the structure of the wearable device, and the problems of structural complexity, difficulty in mass production and high cost of the existing detection solutions are solved.

The embodiments of the present application will be described in detail below with reference to the drawings. In the case of no conflict, the following embodiments and features therein can be combined with each other.

Exemplarily, FIG. 1 is an exploded diagram of a first embodiment of a wearable device provided by embodiments of the present application. As shown in FIG. 1, the wearable device can include: a device housing 11; a capacitive sensor 12, a processing module 13 and a metal structural component 14 which are provided inside the device housing 11, where the metal structural component 14 is adhered to the capacitive sensor 12.

In this embodiment, the metal structural component 14 is configured to increase an electrostatic induction region of the capacitive sensor 12; the processing module 13 is configured to: obtain a real-time capacitance value and an inherent capacitance value of the capacitive sensor 12 to the ground, determine a real-time difference between the real-time capacitance value and the inherent capacitance value, and determine the wearable device to be in a worn state when the real-time difference exceeds a preset threshold.

In this embodiment, the metal structural component 14 is a component inside the device housing 11, e.g. a metal housing or a magnet of a sound generating unit, a metal bracket, etc. Therefore, the metal structural component 14 has an electrostatic induction characteristic. Thus, in the embodiments of the present application, by utilizing the electrostatic induction characteristic of the metal structural component 14 within the device housing 11, the metal structural component 14 can be adhered to the capacitive sensor 12, so that the metal structural component 14 is equivalent to an accessory part of the capacitive sensor 12 to jointly detect whether a human body is wearing the wearable device.

Specifically, as the human body approaches or touches the capacitive sensor 12, the capacitance of the capacitive sensor 12 to the ground (the self-capacitance of the capacitive sensor 12) is increasing. By detecting the real-time capacitance value of the capacitive sensor 12 to the ground, the real-time difference between the real-time capacitance value and the inherent capacitance value is determined. Then whether the wearable device is in the worn state is determined using the magnitude relationship between the real-time difference and the preset threshold.

Exemplarily, in this embodiment, the processing module 13 first obtains the real-time capacitance value of the capacitive sensor 12 to the ground and the inherent capacitance value of the capacitive sensor 12 to the ground to determine the real-time difference between the real-time capacitance value and the inherent capacitance value, and then determines whether the real-time difference exceeds the preset threshold. When the real-time difference is greater than the preset threshold, it is determined that the wearable device is in the worn state; when the real-time difference is less than or equal to the preset threshold, it is determined that the wearable device is in a non-worn state, that is, in a falling-off state.

Exemplarily, the processing module 13 can include a capacitance detection circuit. In an embodiment, the capacitance detection circuit can be used to detect the real-time capacitance value and the inherent capacitance value between the capacitive sensor 12 and the ground.

In actual applications, if the capacitive sensor 12 is installed in a human-body non-sensitive region of the wearable device, when the human body approaches or touches the capacitive sensor 12, the increase of the capacitance of the capacitive sensor 12 to the ground is relatively small. Therefore, the capacitive sensor 12 can be installed in a human-body sensitive region on the wearing side of the wearable device, in order to make the increase of the capacitance of the capacitive sensor 12 to the ground larger when the human body approaches or touches the capacitive sensor 12.

Optionally, in this embodiment, an earphone can be used as the wearable device for description. FIG. 1 shows an earplug of the earphone by way of example. The earplug can include at least: the device housing 11; the capacitive sensor 12, the processing module 13 and the metal structural component 14 which are provided inside the device housing 11, as described above. In actual applications, other devices may also be included, which will not be repeated here.

In the embodiment shown in FIG. 1, an earphone model is used as the wearable device for description. However, those skilled in the art should understand that this earphone model is only an exemplary description. In actual use, those skilled in the art may refer to the solution of the embodiment of the present application and select other models to implement this technical solution.

Optionally, FIG. 1 takes one earplug as an example for description. In actual use, those skilled in the art may refer to the solution of the embodiment of the present application and select a pair of earphones to implement the solution. It should be noted that the wearing detection or touch operations for multiple earplugs may be independent of each other, or may not be independent of each other, which is not limited in this embodiment.

Exemplarily, for the earphone, there is a sound generating unit in the earphone, and a metal housing of the sound generating unit usually has no electrical connection relationship with other devices. Especially when installing the capacitive sensor 12, it is necessary to bypass the sound generating unit and get close to the human-body sensitive region of the wearable device as much as possible to avoid the metal housing of the sound generating unit from interfering with the capacitive sensor 12, but this may affect the sound quality of the earphone, increase the complexity of structural design and installation.

In this embodiment, by utilizing the sound generating unit of the earphone, the capacitive sensor 12 is installed on a first side of the sound generating unit, and the first side is a side away from the wearing side.

Exemplarily, the sound generating unit includes a metal housing and/or a magnet. Therefore, the capacitive sensor can be installed on the first side of the metal housing and/or the magnet, and the metal housing and/or the magnet are used as the intermediate medium between the capacitive sensor 12 and the human body, so as to increase the electrostatic induction region and thus increase the signal amount.

Optionally, in this embodiment, when the foregoing wearable device is an earphone, the solution for implementing the wearing detection using the metal structural component 14 and the capacitive sensor 12 may be applied to different types of earphones, including, but not limited to, in-ear, semi-in-ear, ear-plug, head-mounted types, etc., and the used metal structural component 14 includes, but is not limited to, the metal housing and/or magnet of the sound generating unit, a metal bracket for fixing other components within the earphone, etc. And there may also be various combinations of the capacitive sensor 12 and the metal structural components 14, which will not be described here. Optionally, the magnet of the sound generating unit generally refers to a permanent magnet.

In this embodiment, when the human body approaches or touches the capacitive sensor 12, the capacitance detection function of the processing module 13 can be used to detect the real-time capacitance value and inherent capacitance value of the capacitive sensor 12 to the ground, and thus, based on the real-time difference between the real-time capacitance value and the inherent capacitance value, the wearing and taking-off detection function of the wearable device is realized. Under the premise that the internal structure of the wearable device is not substantially modified, the housing structure of the wearable device is not modified, and the internal space of the wearable device is not additionally occupied, the wearing detection performance of the wearable device is improved. Therefore, the wearable device of this embodiment has the characteristics of being insensitive to the deployment position of the capacitive sensor 12, low cost, flexible application, simple installation, and low difficulty in mass production.

The wearable device provides by the embodiment of the present application includes: the device housing; the capacitive sensor, the processing module and the metal structural component which are provided inside the device housing, where the metal structural component is adhered to the capacitive sensor, and could increase the electrostatic induction region of the capacitive sensor, so that the processing module obtains the real-time capacitance value and the inherent capacitance value of the capacitive sensor to the ground, determines the real-time difference between the real-time capacitance value and the inherent capacitance value, and determines the wearable device to be in the worn state when the real-time difference exceeds the preset threshold. This technical solution improves the wearing detection performance without changing the structure of the wearable device, and solves the problems of structural complexity, difficulty in mass production and high cost of the existing detection solutions.

Figure 2:
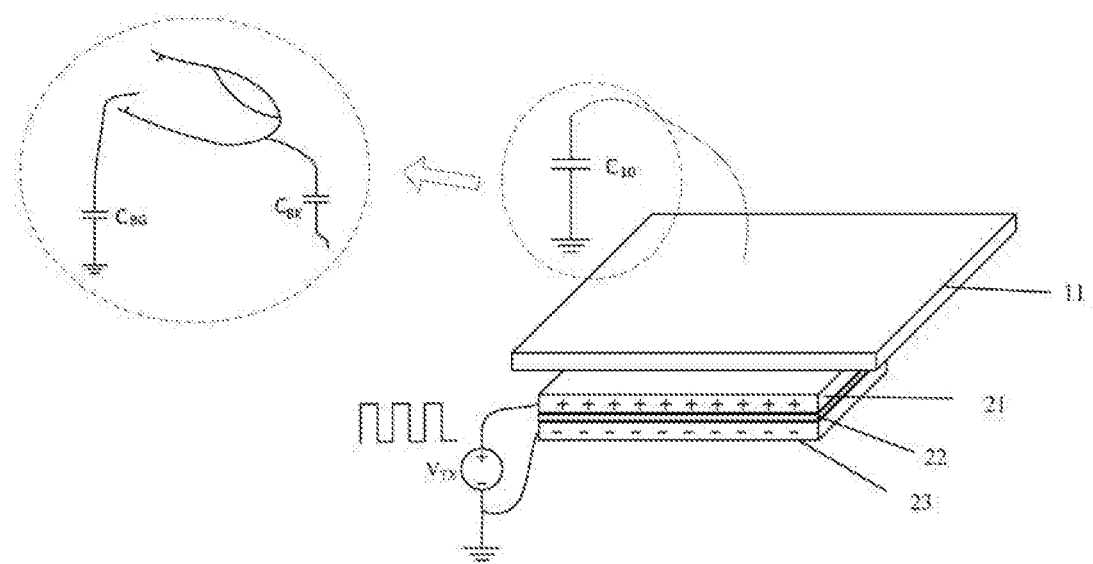
FIG. 2 is a schematic diagram of a principle of detecting human body approach by a capacitive sensor.
Figure 3:
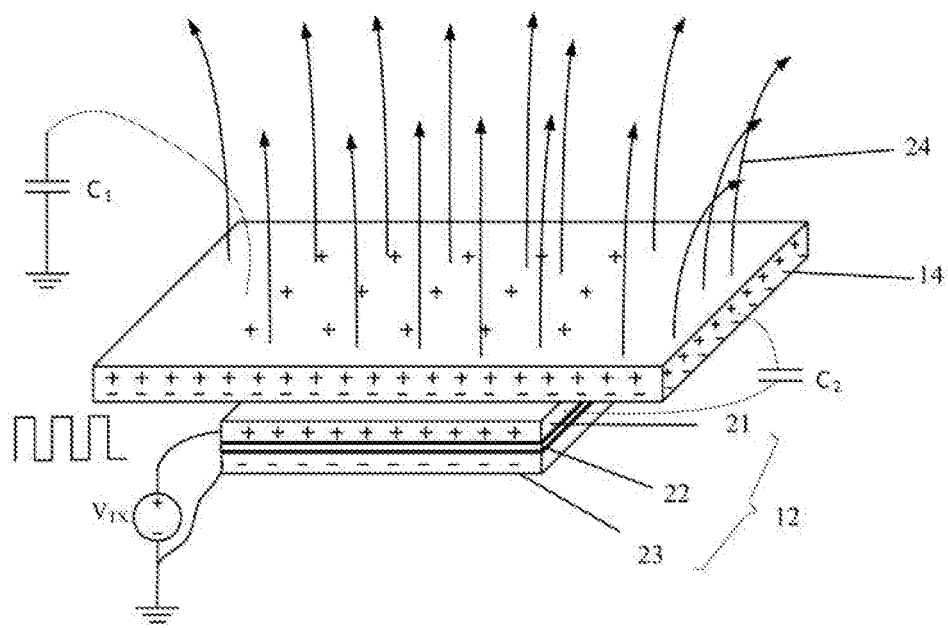
FIG. 3 is a schematic diagram of an approach sensing principle of a metal structural component.

Exemplarily, FIG. 2 is a schematic diagram of a principle of detecting human body approach by a capacitive sensor. FIG. 3 is a schematic diagram of an approach sensing principle of a metal structural component. As shown in FIG. 2 and FIG. 3, the capacitive sensor 12 includes a sensor upper electrode plate 21, a sensor intermediate medium 22, and a sensor lower electrode plate 23.

Specifically, in this embodiment, as shown in FIG. 2, the capacitive sensor 12, which is equivalent to a plate capacitor structure, is formed by the sensor upper electrode plate 21, the sensor intermediate medium 22, and the sensor lower electrode plate 23. After the capacitive sensor 12 is designed, the capacitor between the sensor upper electrode plate 21 and the sensor lower electrode plate 23 can be represented by a capacitor $C_B$. The sensor upper electrode plate 21 is used to sense whether the human body is approaching. When the human body wears the wearable device, electric field lines 24 emitted by the sensor upper electrode plate 21 are affected by the human body, and the capacitance value of the sensor upper electrode plate 21 to the ground changes, so that there is a real-time difference between the real-time capacitance value of the sensor upper electrode plate 21 to the ground and the inherent capacitance value, and the capacitor corresponding to the real-time difference can be represented by $C_{10}$.

The capacitance value of the capacitor $C_{10}$ corresponding to the real-time difference can be determined according to a capacitance value corresponding to a capacitor $C_{BK}$ and a capacitance value corresponding to a capacitor $C_{BG}$. Specifically, the capacitance value of the capacitor $C_{10}$ corresponding to the real-time difference can be a capacitance value after the capacitor $C_{BK}$ and the capacitor $C_{BG}$ are connected in series. The capacitor $C_{BK}$ can be equivalent to the capacitor between the human body and the sensor upper electrode plate 21, and the capacitor $C_{BG}$ can be equivalent to the capacitor of the human body to the ground.

Optionally, in this embodiment, the electrostatic induction effect of the metal structural component 14 can be used, and the metal structural component 14 is taken as a part of the capacitive sensor 12 to enlarge the sensitive range of approach or contact by the human body. The basic principle is shown in FIG. 3. For example, the metal structural component 14 is adhered above the sensor upper electrode plate 21. When the metal structural component 14 is adhered to the sensor upper electrode plate 21, the capacitor between the metal structural component 14 and the capacitive sensor 12 can be equivalent to a second capacitor $C_2$, and the capacitance value corresponding to the second capacitor $C_2$ is called a second capacitance value. The second capacitance value is related to the area of the sensor upper electrode plate 21, the degree of the adhering between the sensor upper electrode plate 21 and the metal structural component 14, and the dielectric constant of the adhering material.

Specifically, the capacitive sensor 12 is charged using the power supply $V_{TX}$. The sensor upper electrode plate 21 is positively charged and the sensor lower electrode plate 23 is negatively charged. Since the metal structural component 14 has a large number of free electrons, according to the characteristic of same charge repulsion and opposite charge attraction, negative charges will be induced on the bottom surface of the metal structural component 14 and positive charges will be induced on the top surface of the metal structural component 14. These positive charges emit the electric field lines 24 which can sense the approach of the human body. This is equivalent to the metal structural component 14 serving as an intermediate medium between the capacitive sensor 12 and the human body. Compared to the electromagnetic field propagation in the air, the attenuation of the electric field propagation in the metal structural component 14 is greatly reduced, and the electric field lines 24 are guided to diffuse to the outside, which enlarges the electrostatic induction region.

Exemplarily, as shown in FIG. 3, when the human body approaches the wearable device, there is a real-time difference between the real-time capacitance value of the capacitive sensor 12 and the inherent capacitance value, and the capacitor corresponding to the real-time capacitance value can be represented by a capacitor $C_{11}$. The real-time difference can be determined according to a first capacitance value and the second capacitance value; where the first capacitance value is a difference between a real-time capacitance value of the metal structural component 14 to the ground and an inherent capacitance value of the metal structural component 14 to the ground, and the second capacitance value is the capacitance value between the metal structural component 14 and the capacitive sensor 12.

Exemplarily, the capacitance corresponding to the first capacitance value may be represented by a capacitor $C_1$, and the capacitance corresponding to the second capacitance value may be represented by a capacitor $C_2$. At this time, the real-time difference can be interpreted as a value obtained after the capacitor $C_1$ corresponding to the first capacitance value and the capacitor $C_2$ corresponding to the second capacitance value are connected in series, that is, $$\frac{C_1 \cdot C_2}{C_1 + C_2}.$$

In actual applications, since the second capacitance value is much larger than the first capacitance value, the real-time difference is approximately equal to the second capacitance value.

Exemplarily, in this embodiment, the metal structural component may be sheet-shaped, and the area of the surface of the metal structural component 14 that is adhered to the capacitive sensor 12 is larger than the area of the surface of the capacitor sensor 12 that is adhered to the metal structural component 14, which enlarges the human-body sensitive region of the wearable device. Therefore, in this embodiment, in the scenario where the metal structural component 14 and the capacitive sensor 12 are adhered, when the human body approaches or wears the wearable device, the real-time difference between the real-time capacitance value of the capacitive sensor 12 to the ground and the inherent capacitance value of the capacitive sensor 12 to the ground becomes larger, which improves the wearing detection performance of the wearable device.

In this embodiment, there can be various adhering modes of the capacitive sensor 12 and a suspended metal. In actual applications, in order to eliminate the influence of the temperature drift on the capacitive sensor 12, the capacitive sensor 12 can be implemented based on the principle of differential driving, that is, the capacitive sensor 12 is a differential capacitive sensor.

Figure 4A:
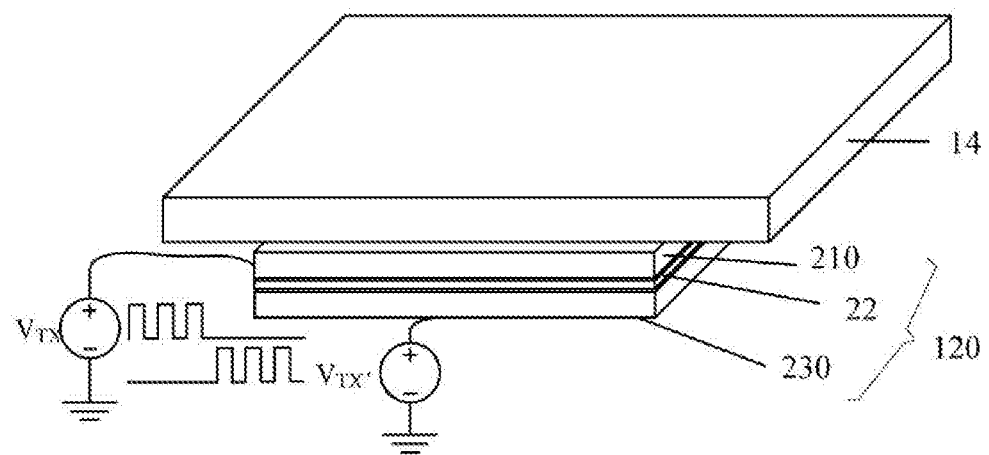
FIG. 4A and FIG. 4B are schematic diagrams of an adhering of a differential capacitive sensor and a metal structural component.
Figure 4B:
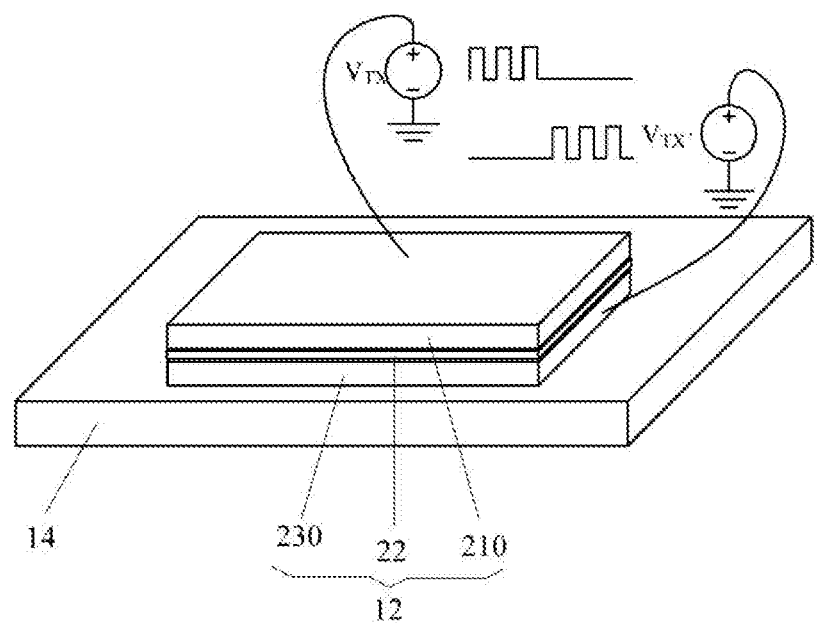

Exemplarily, in a possible implementation of the embodiment of the present application, FIG. 4A and FIG. 4B are schematic diagrams of an adhering of a differential capacitive sensor and a metal structural component. As shown in FIG. 4A and FIG. 4B, the differential capacitive sensor 120 includes a sensor differential positive plate 210, a sensor intermediate medium 22, and a sensor differential negative plate 230.

Exemplarily, FIG. 4A and FIG. 4B exemplarily show two adhering modes. FIG. 4A shows a schematic structural diagram of an adhering of the sensor differential positive plate 210 and the metal structural component 14. FIG. 4B shows a schematic structural diagram of an adhering of the sensor differential negative plate 230 and the metal structural component 14. Whether the sensor differential positive plate 210 is adhered to the metal structural component 14 or the sensor differential negative plate 230 is adhered to the metal structural component 14, both adhering modes can make the increase of the capacitance of the capacitive sensor 12 to the ground larger when the human body approaches or wears the wearable device, that is, both can increase the range of the change in the real-time capacitance value corresponding to the capacitive sensor 12, thereby improving the wearing detection performance.

In FIG. 4A and FIG. 4B, the differential capacitive sensor 120 has two power supplies $V_{TX'}$ and $V_{TX}$, where the power supply $V_{TX}$ is connected to the sensor differential positive plate 210 and the power supply $V_{TX'}$ is connected to the sensor differential negative plate 230.

In this embodiment, the differential capacitive sensor 120 is adhered to the metal structural component 14 to eliminate the influence of the temperature drift and improve the wearing detection performance.

Exemplarily, in a possible design of this embodiment, the wearable device can further include: a metal bracket provided inside the device housing 11.

The metal structural component 14 is the metal bracket.

In this embodiment, when the device housing 11 of the wearable device has the metal bracket inside, for example, a bracket used for supporting, the metal bracket satisfies no electrical connection with other electrical devices, so that the metal bracket can be adhered to the capacitive sensor 12 to increase the human-body sensitive region of the wearable device, and the capacitance detection effect when the human body approaches or wears the wearable device can be improved.

For example, for wearable devices such as earphones, smart watches, and virtual reality (VR) glasses, the metal component inside the device that satisfies no electrical connection may include the metal bracket. In this way, the metal bracket is adhered to the capacitive sensor 12 to increase the human-body electrostatic induction region, so as to improve the wearing performance of the wearable device.

It is worth noting that the adhering mode of the capacitive sensor 12 and the metal structural component 14 is generally determined by the form of the metal structural component. For example, the adhering mode can be divided into a mode in which the sensor upper electrode plate 21 is adhered to the metal structural component 14 and a mode in which the sensor lower electrode plate 23 is adhered to the metal structural component 14. The embodiment of the present application does not limit the combination mode of the capacitive sensor 12 and the metal structural component 14.

Exemplarily, in another possible design of this embodiment, the wearable device includes an earphone. The following uses the metal structural component 14 in the earphone for explanation.

Figure 5:
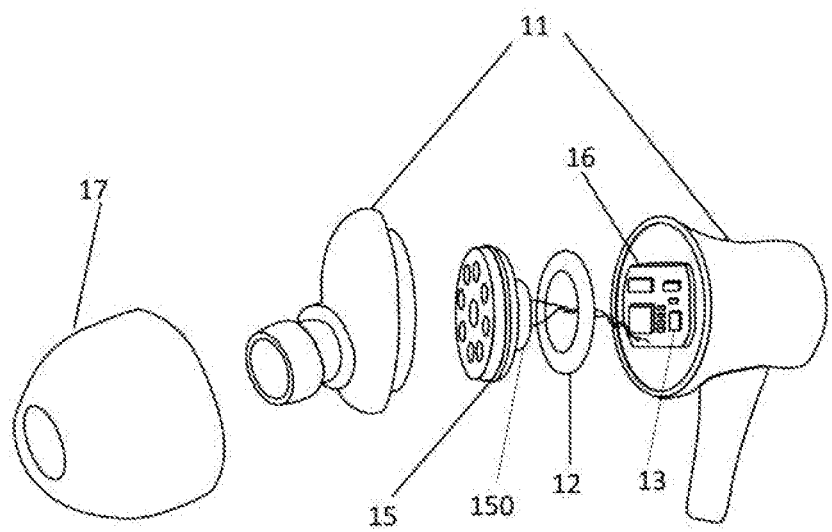
FIG. 5 is an exploded diagram of a wearable device according to an embodiment.

FIG. 5 is an exploded diagram of a wearable device according to an embodiment. As shown in FIG. 5, the wearable device further includes: a sound generating unit 15 provided inside the device housing 11.

The metal structural component 14 is a metal housing 150 and/or a magnet of the sound generating unit 15.

In this embodiment, the wearing detection of the optical or traditional capacitive solution generally requires the capacitive sensor 12 to be installed in a front mouth tube or a sound cavity, which has to sacrifice sound quality and is difficult to install. In view of this, as shown in FIG. 5, the embodiment of the present application adopts the foregoing solution, e.g. when the wearable device further includes the sound generating unit 15 provided inside the device housing 11, the metal housing 150 of the sound generating unit 15 is used as the metal structural component 14 and is adhered to the capacitive sensor 12.

Exemplarily, in actual applications, there is no metal housing for the sound generating unit of some wearable devices, and their magnet is directly exposed to the outside. Therefore, in this scenario, the above-mentioned metal structural component 14 can be the magnet of the sound generating unit 15 directly.

It is worth noting that when the sound generating unit of the wearable device includes both the metal housing and the magnet, the metal structural component 14 may be the metal housing and the magnet. This embodiment does not limit the specific representation of the metal structural component 14, which can be determined according to actual conditions.

Optionally, in this embodiment, referring to FIG. 5, the device housing 11 further includes a device mainboard 16 inside, and various circuits are deployed on the device mainboard 16 to implement the functions of the wearable device. For example, the processing module 13 described above can be deployed on the device mainboard 16.

Optionally, as shown in FIG. 5, the wearable device further includes a silicone cap 17, and the silicone cap 17 can be provided outside the device housing 11. On the one hand, the silicone cap 17 is used to protect the device housing 11; on the other hand, it can improve the user's comfort level of wearing.

In a possible implementation of this embodiment, the type of the sound generating unit 15 is a moving-coil type, and then the foregoing adhering of the metal structural component 14 and the capacitive sensor 12 may be implemented in the following way:

adhering the capacitive sensor 12 to one side of the metal housing and/or one side of the magnet.

Specifically, when the capacitive sensor 12 includes the sensor upper electrode plate 21, the sensor intermediate medium 22, and the sensor lower electrode plate 23, the adhering of the capacitive sensor 12 to one side of the metal housing and/or one side of the magnet can be achieved in the following way: adhering the sensor upper electrode plate 21 to the first side of the metal housing and/or the first side of the magnet, where the first side is a side away from the wearing side of the wearable device.

Figure 6:
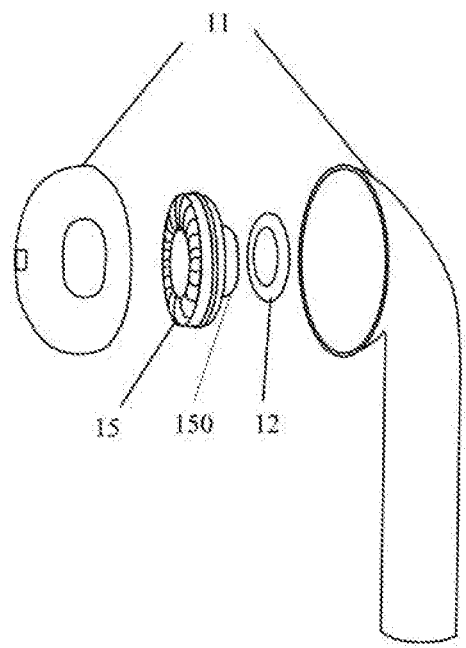
FIG. 6 is an exploded diagram of a semi-in-ear earphone.

Exemplarily, FIG. 6 is an exploded diagram of a semi-in-ear earphone. As shown in FIG. 6, within the device housing 11 of the earphone, the sound generating unit 15 is usually of a moving-coil type, and its housing is generally a metal component without any electrical connection with other electrical devices. In this way, the capacitive sensor 12 can be adhered to the first side of the metal housing 150 of the earphone sound generating unit 15 (that is, the side away from the wearing side of the wearable device), and the electrostatic induction characteristic of the metal housing 150 can be used to enlarge the sensitive region for capacitance detection and to achieve the non-contact wearing detection. In this way, without changing the structure of the wearable device, the electrostatic induction area is increased, and the signal amount is increased. In addition, the anti-sweat effect of the earphone is improved, and the rate of falling off mistakenly is reduced.

In another possible implementation of this embodiment, a part of the metal housing 150 is wrapped inside the capacitive sensor 12.

Optionally, the part of the metal housing 150 is connected to the sensor lower electrode plate 23 by adhering.

Figure 7:
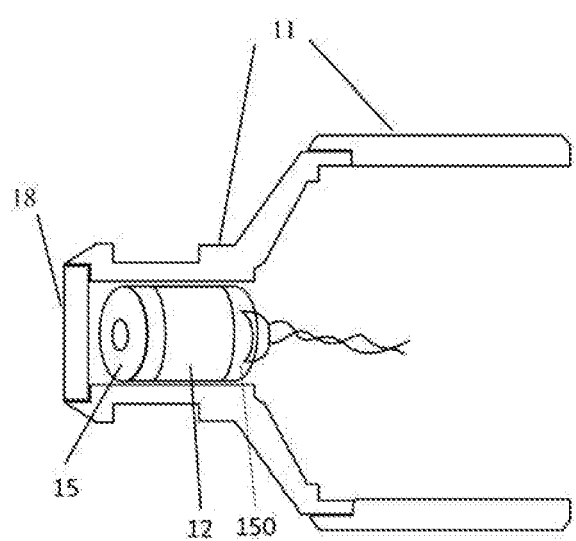
FIG. 7 is an exploded diagram of an in-ear earphone.

Exemplarily, FIG. 7 is an exploded diagram of an in-ear earphone. As shown in FIG. 7, for the in-ear earphone, the sound generating unit 15 is a speaker installed at the front mouth part. At this time, the capacitive sensor 12 can wrap a part of the housing of the sound generating unit 15 so that the part of the housing is connected to the sensor lower electrode plate 23*by* adhering. The electrostatic induction region when the human body approaches or wears the wearable device can also be increased, and the solution has the advantages such as simple installation and low mass-production cost.

Optionally, as shown in FIG. 7, in this embodiment, a dust mesh 18 is further provided at the front mouth position of the earphone, and the dust mesh 18 can prevent dust from entering the earphone housing to a certain degree.

Optionally, for wearable devices, the metal component inside the device that satisfies no electrical connection is generally the metal housing of the sound generating unit and the magnet of the sound generating unit. There are some types of wearable devices which may have the metal bracket. The combination mode of the capacitive sensor 12 and the metal structural component 14 is generally determined by the form of the metal structural component 14. In general, the adhering of the capacitive sensor 12 and the metal structural component 14 can be divided into a mode in which the sensor upper electrode plate 21 is adhered to the metal structural component 14 and a mode in which the sensor lower electrode plate 23 is adhered to the metal structural component 14. The embodiment of the present application does not limit the combination mode of the capacitive sensor 12 and the metal structural component 14.

In summary, for wearable devices such as earphones, the existing wearing detection methods need to make holes or dig a groove in the earphone housing (the sensitive region that is in contact with the human body) to ensure that the capacitive sensor obtains sufficient signals, which will sacrifice the original sound quality of the earphones, resulting in the problems of high structural complexity and high mass-production cost. By adhering the metal structural component provided inside the device housing to the capacitive sensor in this embodiment, the electrostatic induction region is enlarged, and the wearing detection efficiency is improved, solving the above problems. In addition, the application design of the solution of this embodiment is flexible, and can be applied to any wearable devices including, but not limited to, earphones, thereby having a wide application range.

The following are method embodiments of the present application, which can be applied to the wearable devices of the present application. For details that are not disclosed in the method embodiments of the present application, please refer to the embodiments of the wearable devices in the present application.

Figure 8:
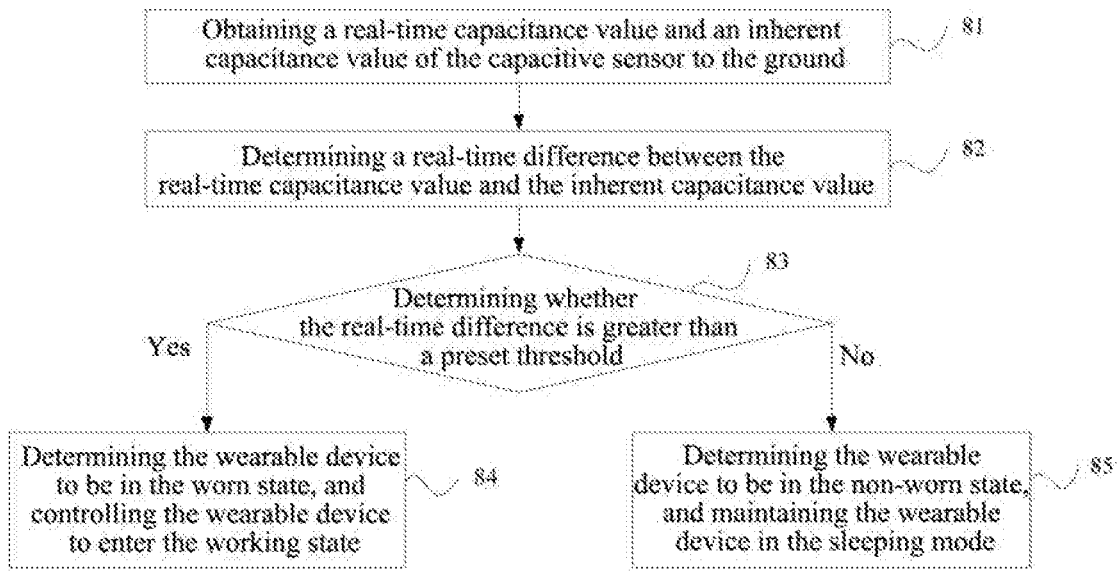
FIG. 8 is a flowchart of a first embodiment of a wearing detection method provided by embodiments of the present application.

FIG. 8 is a flowchart of a first embodiment of a wearing detection method provided by embodiments of the present application. This method is applied to the wearable devices shown in FIG. 1 to FIG. 7. The wearable device can include: a device housing; a capacitive sensor, a processing module and a metal structural component which are provided inside the device housing, where the metal structural component is adhered to the capacitive sensor, and the metal structural component is configured to increase an electrostatic induction region of the capacitive sensor.

Exemplarily, as shown in FIG. 8, the wearing detection method can include the following steps.

Step 81: Obtaining a real-time capacitance value and an inherent capacitance value of the capacitive sensor to the ground.

Optionally, the wearable device can detect the capacitance value of the capacitive sensor to the ground through the processing module in real time. In a normal state, when the human body does not approach, the capacitance of the capacitive sensor to the ground detected by the processing module is nearly constant, which can be considered as the inherent capacitance of the capacitive sensor to the ground.

When the human body approaches the wearable device, the wearable device detects a large change in the capacitance of the capacitive sensor to the ground through the processing module, and obtains the real-time capacitance value of the capacitive sensor to the ground.

Regarding the specific implementation principle of this step, reference may be made to the description of the foregoing embodiments of the wearable devices, and details are not repeated here again.

Step 82: Determining a real-time difference between the real-time capacitance value and the inherent capacitance value.

Exemplarily, the processing module of the wearable device can further calculate the real-time difference between the real-time capacitance value and the inherent capacitance value according to the obtained real-time capacitance value and inherent capacitance value of the capacitive sensor to the ground. Regarding the specific implementation principle of this solution, reference may be made to the description of the embodiment shown in FIG. 9 below, which is not repeated here.

Step 83: Determining whether the real-time difference is greater than a preset threshold; if yes, executing step 84; if no, executing step 85.

In this embodiment, in order to enable the wearable device to automatically change the working mode, a preset threshold can be set inside the wearable device and used to indicate a critical value between a worn state and a non-worn state of the wearable device. The wearable device can compare the determined real-time difference with the preset threshold, and determine the state of the wearable device and the working mode of the wearable device according to the comparison result.

Step 84: Determining the wearable device to be in the worn state, and controlling the wearable device to enter the working state.

As an example, when the wearable device determines that the real-time difference between the real-time capacitance value and the inherent capacitance value is greater than the preset threshold, the wearable device is considered to be in the worn state. Further, in order to improve the user experience, the wearable device can automatically enter the working state from the sleeping state.

Step 85: Determining the wearable device to be in the non-worn state, and maintaining the wearable device in the sleeping mode.

As another example, when the wearable device determines that the real-time difference between the real-time capacitance value and the inherent capacitance value is less than or equal to the preset threshold, the wearable device is considered to be in the non-worn state. In order to reduce the power consumption of the wearable device, the wearable device is maintained in the sleeping mode, thereby improving the endurance performance.

According to the wearing detection method provided in the embodiment of the present application, the real-time capacitance value and the inherent capacitance value of the capacitive sensor to the ground are obtained to determine the real-time difference between the real-time capacitance value and the inherent capacitance value. Then the wearable device is determined to be in the worn state when the real-time difference is greater than the preset threshold, and the wearable device is controlled to enter the working state; and when the wearable device determines that the real-time difference between the real-time capacitance value and the inherent capacitance value is less than or equal to the preset threshold, the wearable device is determined to be in the non-worn state and maintained in the sleeping mode. The technical solution can improve the wearing detection performance of the wearable device, and solves the problems of structural complexity, difficulty in mass production and high cost of the existing detection solutions.

Figure 9:
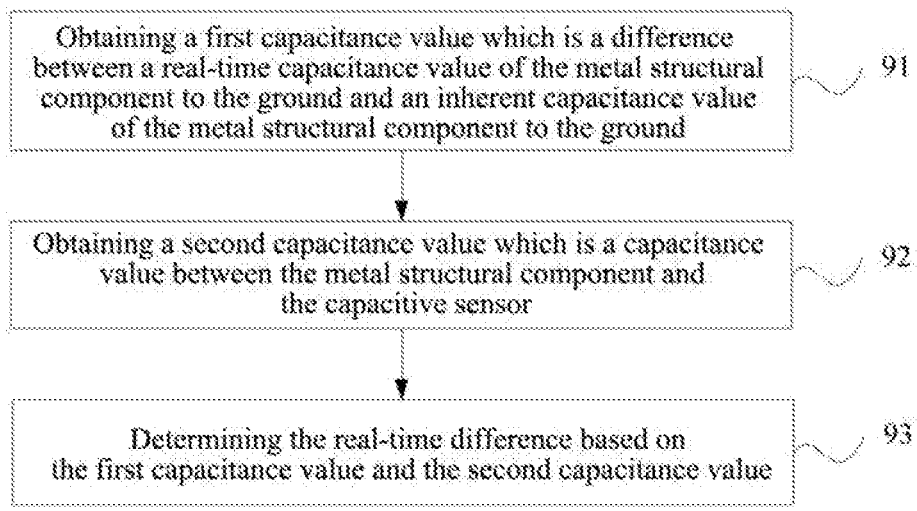
FIG. 9 is a flowchart of a second embodiment of a wearing detection method provided by embodiments of the present application.

Exemplarily, on the basis of the above embodiment, FIG. 9 is a flowchart of a second embodiment of a wearing detection method provided by embodiments of the present application. In this embodiment, as shown in FIG. 9, the foregoing step 82 can be implemented by the following steps.

Step 91: Obtaining a first capacitance value which is a difference between a real-time capacitance value of the metal structural component to the ground and an inherent capacitance value of the metal structural component to the ground.

In this embodiment, for a certain wearable device, the metal structural component has an inherent capacitance value to the ground. As the human body approaches the wearable device, the real-time capacitance value of the metal structure to the ground gradually increases, and the difference between the real-time capacitance value of the metal structural component to the ground and the inherent capacitance value of the metal structural component to the ground is determined, that is, a first capacitance value is determined.

Step 92: Obtaining a second capacitance value which is a capacitance value between the metal structural component and the capacitive sensor.

In this embodiment, due to the electrostatic induction characteristic of the metal structural component, when the metal structural component is adhered to the capacitive sensor, there is a capacitance value between the metal structural component and the capacitive sensor, which is called a second capacitance value in this embodiment. The size of the second capacitance value can be obtained through the processing module.

Step 93: Determining the real-time difference based on the first capacitance value and the second capacitance value.

Exemplarily, in this embodiment, the metal structural component is used as an accessory part of the capacitive sensor to sense the approach and wearing of the human body. Therefore, the real-time difference can be interpreted as a value obtained after a capacitor corresponding to the first capacitance value and a capacitor corresponding to the second capacitance value are connected in series.

Regarding the specific implementation principle of this step, reference may be made to the description of the foregoing embodiments shown in FIG. 2 and FIG. 3, and details are not repeated here again.

According to the wearing detection method provided in the embodiment of the present application, the wearable device obtains the first capacitance value, which is the difference between the real-time capacitance value of the metal structural component to the ground and the inherent capacitance value of the metal structural component to the ground, and obtains the second capacitance value, which is the capacitance value between the metal structural component and the capacitive sensor. Then the wearable device determines the real-time difference based on the first capacitance value and the second capacitance value. This technical solution can accurately and timely determine the real-time capacitance change amount of the capacitive sensor to the ground, which provides the implementation conditions for subsequent determination of the wearing state of the wearable device.

Exemplarily, in any of the foregoing embodiments, the capacitive sensor is a differential capacitive sensor.

For the description that is not elaborated in the wearing detection method provided in the embodiments of the present application, reference may be made to the description of the embodiments shown in FIG. 1 to FIG. 7, and details are not described here again.

It should be noted that the foregoing method embodiments of the present application may be applied to a processor or implemented by a processor. The processor may be an integrated circuit chip with signal processing capabilities. In the implementation process, each step of the foregoing method embodiments may be completed using an integrated logic circuit of hardware in the processor or instructions in a software form. The above-mentioned processor may be a general-purpose processor, a digital signal processor (DSP), an application specific integrated circuit (ASIC), a field programmable gate array (FPGA), or other programmable logic devices, discrete gate or transistor logic devices, discrete hardware components. Various methods, steps, and logical block diagrams disclosed in the embodiments of the present application can be implemented or executed. A general-purpose processor may be a microprocessor or the processor may be any conventional processor or the like. The steps of the methods disclosed in combination with the embodiments of the present application may be directly implemented by a hardware decoding processor, or may be implemented using a combination of hardware and software modules in the decoding processor. The software modules may be located in a mature storage medium such as a random access memory, a flash memory, a read-only memory, a programmable read-only memory, an electrically erasable programmable memory, a register, or the like. The storage medium is located in a memory, and the processor reads the information in the memory and completes the steps of the foregoing methods in combination with its hardware.

It can be understood that the memory in the embodiments of the present application may be a volatile memory or a non-volatile memory, or may include both volatile memory and non-volatile memory. The non-volatile memory may be a read-only memory (ROM), a programmable ROM (PROM), an erasable PROM (EPROM), or an electrically EPROM (EEPROM) or a flash memory. The volatile memory may be a random access memory (RAM), which is used as an external cache. By way of example, but not limitation, many forms of RAM are available, e.g. a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM). It should be noted that the memory of the systems and methods described herein is intended to include, but is not limited to, these memories and any other suitable types of memories.

The present application also provides a storage medium, where the storage medium has instructions stored thereon which, when running on a computer, cause the computer to execute the above-mentioned wearing detection method. For the content and effect thereof, please refer to the method embodiments and no further description is provided.

In the present application, "at least one" means one or more, and "multiple" means two or more. "And/or" describes the association relationship of related objects, and indicates that there can be three kinds of relationships, for example, A and/or B can represent three cases that: A exists alone, A and B exist simultaneously, and B exists alone, where A and B can be singular or plural. The character "/" generally indicates that the related objects before and after the character have an "or" relationship; in the formula, the character "/" indicates that the related objects before and after the character have a "divide" relationship.

It can be understood that various numerical numbers involved in the embodiments of the present application are only for the convenience of description and are not used to limit the scope of the embodiments of the present application.

It can be understood that, in the embodiments of the present application, the sequence numbers of the above processes do not mean the order of execution. The execution order of the processes should be determined by their functions and internal logic, rather than being construed as limitations to the implementation process of the embodiments of the present application.

Finally, it should be noted that the above embodiments are only used to describe the technical solutions of the present application, rather than limiting them. Although the present application has been described in detail with reference to the foregoing embodiments, those skilled in the art should understand that: the technical solutions described in the foregoing embodiments may still be modified, or some or all of the technical features may be equivalently replaced; and these modifications or replacements do not make the essence of the corresponding technical solutions depart from the scope of the technical solutions of the embodiments of the present application.

What is claimed is:

1. A wearable device, comprising: a device housing; a capacitive sensor, a processing module and a metal structural component which are provided inside the device housing, wherein the metal structural component is adhered to the capacitive sensor;
   the metal structural component is configured to increase an electrostatic induction region of the capacitive sensor; the processing module is configured to: obtain a real-time capacitance value and an inherent capacitance value of the capacitive sensor to ground, determine a real-time difference between the real-time capacitance value and the inherent capacitance value, and determine the wearable device to be in a worn state when the real-time difference is greater than a preset threshold;
   wherein the real-time difference is determined according to a first capacitance value and a second capacitance value;
   the first capacitance value is a difference between a real-time capacitance value of the metal structural component to the ground and an inherent capacitance value of the metal structural component to the ground;
   the second capacitance value is a capacitance value between the metal structural component and the capacitive sensor.

2. The wearable device according to claim 1, wherein the capacitive sensor is a differential capacitive sensor.

3. The wearable device according to claim 2, wherein the metal structural component is sheet-shaped, and an area of a surface of the metal structural component that is adhered to the capacitive sensor is larger than an area of a surface of the capacitive sensor that is adhered to the metal structural component.

4. The wearable device according to claim 1, wherein the wearable device further comprises: a metal bracket provided inside the device housing;
   the metal structural component is the metal bracket.

5. The wearable device according to claim 4, wherein the metal structural component is sheet-shaped, and an area of a surface of the metal structural component that is adhered to the capacitive sensor is larger than an area of a surface of the capacitive sensor that is adhered to the metal structural component.

6. The wearable device according to claim 2, wherein the wearable device further comprises: a metal bracket provided inside the device housing;
   the metal structural component is the metal bracket.

7. The wearable device according to claim 6, wherein the metal structural component is sheet-shaped, and an area of a surface of the metal structural component that is adhered to the capacitive sensor is larger than an area of a surface of the capacitive sensor that is adhered to the metal structural component.

8. The wearable device according to claim 1, wherein the wearable device comprises: an earphone.

9. The wearable device according to claim 8, wherein the wearable device further comprises: a sound generating unit provided inside the device housing;
   the metal structural component is a metal housing and/or a magnet of the sound generating unit.

10. The wearable device according to claim 9, wherein a type of the sound generating unit is a moving-coil type, and that the metal structural component is adhered to the capacitive sensor comprises that:
    the capacitive sensor is adhered to one side of the metal housing and/or one side of the magnet.

11. The wearable device according to claim 10, wherein the capacitive sensor comprises: a sensor upper electrode plate, a sensor intermediate medium, and a sensor lower electrode plate;
    that the capacitive sensor is adhered to one side of the metal housing and/or one side of the magnet comprises that:
    the sensor upper electrode plate is adhered to a first side of the metal housing and/or a first side of the magnet, and the first side is a side away from a wearing side of the wearable device.

12. The wearable device according to claim 9, wherein a part of the metal housing is wrapped inside the capacitive sensor.

13. The wearable device according to claim 12, wherein the capacitive sensor comprises: a sensor upper electrode plate, a sensor intermediate medium, and a sensor lower electrode plate;
    that the metal structural component is adhered to the capacitive sensor comprises that:
    the part of the metal housing is adhered to the sensor lower electrode plate.

14. The wearable device according to claim 1, wherein the metal structural component is sheet-shaped, and an area of a surface of the metal structural component that is adhered to the capacitive sensor is larger than an area of a surface of the capacitive sensor that is adhered to the metal structural component.

15. A wearing detection method, wherein the method is applied to a wearable device, and the wearable device comprises: a device housing; a capacitive sensor, a processing module and a metal structural component which are provided inside the device housing, wherein the metal structural component is adhered to the capacitive sensor, and the metal structural component is configured to increase an electrostatic induction region of the capacitive sensor; the method comprises:
    obtaining a real-time capacitance value and an inherent capacitance value of the capacitive sensor to ground;
    determining a real-time difference between the real-time capacitance value and the inherent capacitance value; and
    determining the wearable device to be in a worn state when the real-time difference is greater than a preset threshold;
    wherein the determining a real-time difference between the real-time capacitance value and the inherent capacitance value, comprises:
    obtaining a first capacitance value, wherein the first capacitance value is a difference between a real-time capacitance value of the metal structural component to the ground and an inherent capacitance value of the metal structural component to the ground;

obtaining a second capacitance value, wherein the second capacitance value is a capacitance value between the metal structural component and the capacitive sensor; and determining the real-time difference based on the first capacitance value and the second capacitance value.

16. A non-transitory machine-readable storage medium, wherein the storage medium has instructions stored thereon which, when running on a computer, cause the computer to execute the wearing detection method according to claim 15.

17. A wearable device, comprising: a device housing; a capacitive sensor, a processing module and a metal structural component which are provided inside the device housing, wherein the metal structural component is adhered to the capacitive sensor;

the metal structural component is configured to increase an electrostatic induction region of the capacitive sensor; the processing module is configured to: obtain a real-time capacitance value and an inherent capacitance value of the capacitive sensor to ground, determine a real-time difference between the real-time capacitance value and the inherent capacitance value, and determine the wearable device to be in a worn state when the real-time difference is greater than a preset threshold;

wherein the metal structural component is sheet-shaped, and an area of a surface of the metal structural component that is adhered to the capacitive sensor is larger than an area of a surface of the capacitive sensor that is adhered to the metal structural component.

\* \* \* \* \*